United States Patent
Cho et al.

(10) Patent No.: US 7,290,917 B2
(45) Date of Patent: Nov. 6, 2007

(54) LIGHT GUIDE PLATE WITH INTERNAL LIGHT GUIDE ELEMENTS AND BACKLIGHT MODULE USING THE SAME

(75) Inventors: Hung-Sheng Cho, Miao-Li (TW); Chiu-Lien Yang, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 0 days.

(21) Appl. No.: 11/284,712

(22) Filed: Nov. 21, 2005

(65) Prior Publication Data
US 2006/0110124 A1 May 25, 2006

(30) Foreign Application Priority Data
Nov. 19, 2004 (TW) .............................. 93135566 A

(51) Int. Cl.
*F21V 7/04* (2006.01)
(52) U.S. Cl. ..................... 362/616; 362/331; 362/561; 362/606
(58) Field of Classification Search ................ 362/331, 362/561, 606, 629, 616
See application file for complete search history.

(56) References Cited

U.S. PATENT DOCUMENTS

| | | | |
|---|---|---|---|
| 6,104,454 A * | 8/2000 | Hiyama et al. ................ 349/65 |
| 6,755,548 B2 | 6/2004 | Ho | |
| 2001/0002165 A1* | 5/2001 | Shinohara et al. ............ 362/31 |
| 2004/0022050 A1* | 2/2004 | Yamashita et al. ........... 362/31 |
| 2004/0201796 A1* | 10/2004 | Yun et al. ..................... 349/96 |

* cited by examiner

*Primary Examiner*—Stephen F. Husar
*Assistant Examiner*—Meghan K. Dunwiddie
(74) *Attorney, Agent, or Firm*—Wei Te Chung

(57) ABSTRACT

A light guide plate (32) for a backlight module includes a light incident surface (321), a bottom surface (323), and a plurality of light guide elements (320) disposed therein. Each light guide element has a light refractive surface (324) opposite to the light incident surface. An angle between the light refractive surface and the bottom surface is an acute angle. A refractive index of each light guide element is different from that of adjacent light guide elements. The reflectivity index of the light guide element and the angle can be selected and arranged so that most if not all the light beams are emitted from the light output surface. Thereby, the light guide plate is highly efficient in the utilization of light beams.

13 Claims, 2 Drawing Sheets

LIGHT GUIDE PLATE WITH INTERNAL LIGHT GUIDE ELEMENTS AND BACKLIGHT MODULE USING THE SAME

FIELD OF THE INVENTION

The present invention relates to light guide plates and backlight modules using the same, and especially to a light guide plate and a backlight module for use in liquid crystal displays or the like.

BACKGROUND

Most portable electronic devices such as laptop and notebook computers, mobile phones, and game devices have flat viewing screens unlike the cathode-ray-tube (CRT) monitors of conventional desktop computers. Nevertheless, users still generally expect the flat viewing screens to provide performance equal to that of CRT monitors. To meet this demand, computer manufacturers have sought to build flat panel displays (FPDs) offering superior resolution, color, and contrast, while at the same time requiring minimal power consumption. Liquid crystal displays (LCDs) are one type of FPD that satisfy these expectations. However, the liquid crystals of an LCD are not self-luminescent. Rather, the LCD generally needs a surface emitting device such as a backlight module which offers sufficient luminance (brightness) in a wide variety of ambient light environments.

Referring to FIG. 7, this is a side view of a conventional backlight module. The backlight module 10 includes a light source 11, a light guide plate 12, a diffuser 13, a prism film 14, and a reflector 16. The light guide plate 12 includes a light output surface 122, a bottom surface 123 opposite to the light output surface 122, and a light incident surface 121 and side surfaces (not shown) interconnecting the light output surface 122 and the bottom surface 123. The reflector 16 is disposed adjacent to the bottom surface 123. The diffuser 13 and the prism film 14 are stacked in that order on the light output surface 122. The light source 11 is disposed adjacent to the light incident surface 121, for facilitating efficient transmission of light beams emitted by the light source 11 to the light guide plate 12. A plurality of dots 124 is formed at the bottom surface 123, in order to reduce internal reflection of light beams and provide more uniform brightness.

In operation, light beams emitted from the light source 11 enter the light guide plate 12. Some of the light beams strike the bottom surface 123, are scattered by the dots 124 and/or reflected by the reflector 16, and then exit through the output surface 122. Other light beams directly exit through the output surface 122. The light beams that exit through the output surface 122 then transmit through the diffuser 13 and the prism film 14, and finally illuminate a liquid crystal panel (not shown).

However, some of light beams propagating within the light guide plate 12 strike the side surfaces, and a portion of the light beams scattered by the dots 124 and/or reflected by the reflector 16 also strike the side surfaces. Light beams striking the side surfaces are liable to leak out from the side surfaces and be lost. Thereby, the backlight module 10 may have low efficiency in the utilization of light beams.

What is needed, therefore, is a backlight module which can provide highly efficient utilization of light beams.

SUMMARY

A light guide plate includes a light incident surface, a bottom surface, and a plurality of internal light guide elements. Each light guide element has a light refractive surface opposite to the light incident surface. An angle between the light refractive surface and the bottom surface is an acute angle. A refractive index of each light guide element is different from that of adjacent light guide elements.

A backlight module includes a light source, a reflector, and the above-described light guide plate. The light source is disposed adjacent to the light incident surface. The reflector is disposed adjacent to the bottom surface.

In the light guide plate of the backlight module, the refractivity indexes of the light guide elements and the angles between the light refractive surfaces and the bottom surface can be adjusted to enable most if not all of the light beams entering the light guide plate to be emitted from the light output surface. Thereby, the backlight module employing the light guide plate provides highly efficient utilization of the light beams.

Other advantages and novel features will become more apparent from the following detailed description when taken in conjunction with the accompanying drawings.

DETAILED DESCRIPTION OF PREFERRED EMBODIMENTS

Figure 1:
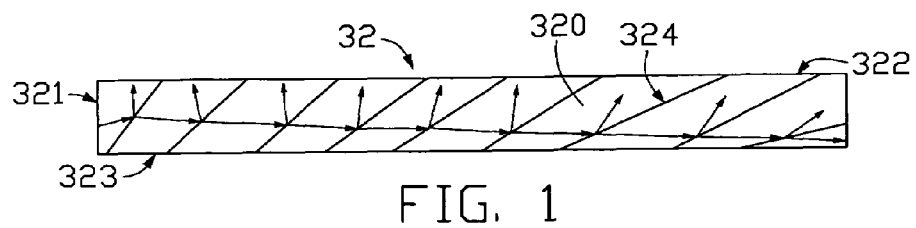
FIG. 1 is a schematic side view depicting light propagation in a light guide plate according to a first embodiment of the present invention.

Referring to FIG. 1, this is a schematic side view depicting light propagation in a light guide plate according to a first embodiment of the present invention. The light guide plate 32 includes a light incident surface 321, a bottom surface 323 generally perpendicular to the light incident surface 321, and a plurality of internal light guide elements 320. The light guide plate 32 further includes a light output surface 322 opposite to the bottom surface 323.

Each light guide element 320 has a light refractive surface 324 opposite to the light incident surface 321, wherein the light refractive surface 324 and the light incident surface 321 are both planar surfaces. An angle (not labeled) between the light refractive surface 324 and the bottom surface 323 is an acute angle. The angles between the light refractive surfaces 324 and the bottom surface 323 progressively decrease along a direction away from the light incident surface 321. The light guide elements 320 are made from resin, such as polymethyl methacrylate resin, polyacrylic acid resin, polycarbonate, or polyvinyl resin. A refractive index of each light guide element 320 is different from that of adjacent light guide elements 320.

In operation, light beams emitted by a light source (not shown) enter the light guide plate 32 via the light incident surface 321, and then are reflected and refracted by the light guide elements 320 respectively. Respective values of a reflectivity index R and a transmissive index T of the light guide elements 320 are defined by the following formulas:

$$R_i = |r_{p,i}|^2 + |r_{s,i}|^2; \quad T_i = |t_{p,i}|^2 + |t_{s,i}|^2$$

wherein:

$$r_{p,i} = -\frac{n_{i+1}\cos\theta_i - n_i\cos\theta_{i+1}}{n_{i+1}\cos\theta_i + n_i\cos\theta_{i+1}};$$

$$r_{s,i} = -\frac{n_{i+1}\cos\theta_{i+1} - n_i\cos\theta_i}{n_{i+1}\cos\theta_{i+1} + n_i\cos\theta_i};$$

$$t_{p,i} = \frac{2n_i\cos\theta_i}{n_{i+1}\cos\theta_i + n_i\cos\theta_{i+1}}; \text{ and}$$

$$t_{s,i} = \frac{2n_i\cos\theta_i}{n_{i+1}\cos\theta_{i+1} + n_i\cos\theta_i};$$

In the above formulas, $R_i$ represents the reflective index of the number i light guide element 320 in the series of light guide elements 320, $T_i$ represents the transmissive index of the number i light guide element 320; $R_{s,i}$ and $T_{s,i}$ respectively represent the reflective index and the transmissive index of the number i light guide element 320 when s-polarized light strikes the number i light guide element 320, and $R_{p,i}$ and $T_{p,i}$ respectively represent the reflective index and the transmissive index of the number i light guide element 320 when p-polarized light strikes the number i light guide element 320. The reflected and refracted light beams subsequently emit from the light output surface 322.

In the light guide plate 32, the reflectivity indexes of the light guide elements 320 and the angles between the light refractive surfaces 324 and the bottom surface 323 can be adjusted to enable most or even all of the light beams entering the light guide plate 32 to be emitted from the light output surface 322. Thereby, the light guide plate 32 is highly efficient in the utilization of light beams.

Figure 2:
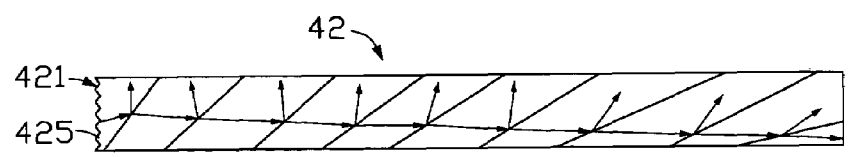
FIG. 2 is a schematic side view depicting light propagation in a light guide plate according to a second embodiment of the present invention.

Referring to FIG. 2, this is a schematic side view depicting light propagation in a light guide plate according to a second embodiment of the present invention. The light guide plate 42 has a structure similar to that of the light guide plate 32. However, in the light guide plate 42, a light incident surface 421 defines a grating 425 thereat.

Figure 3:
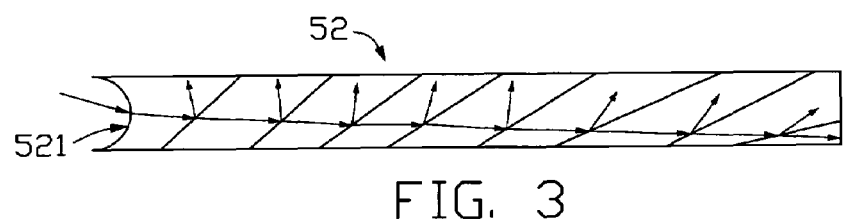
FIG. 3 is a schematic side view depicting light propagation in a light guide plate according to a third embodiment of the present invention.

Referring to FIG. 3, this is a schematic side view depicting light propagation in a light guide plate according to a third embodiment of the present invention. The light guide plate 52 has a structure similar to that of the light guide plate 32. However, in the light guide plate 52, a light incident surface 521 has a concave, arc-shaped profile. A center of an imaginary circle that the arc lies on is located outside the light guide plate 52.

Figure 4:
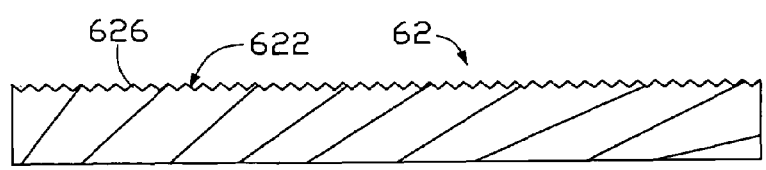
FIG. 4 is a schematic side view of a light guide plate according to a fourth embodiment of the present invention.

Referring to FIG. 4, this is a schematic side view of a light guide plate according to a fourth embodiment of the present invention. The light guide plate 62 has a structure similar to that of the light guide plate 32. However, in the light guide plate 62, a light output surface 622 has a plurality of linear prisms 626 formed thereat.

Figure 5:
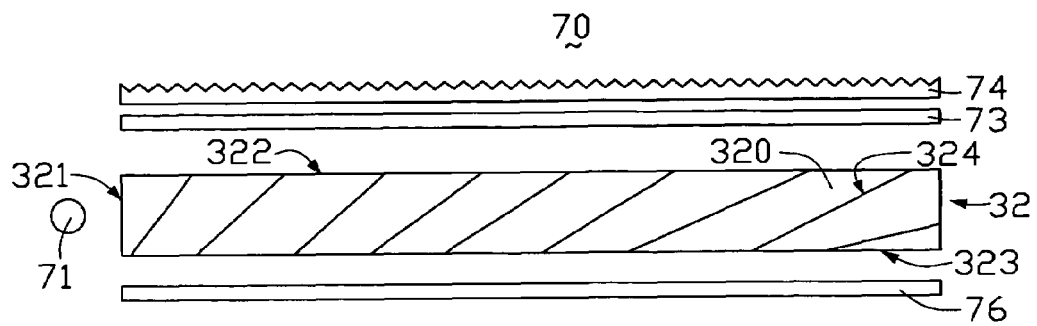
FIG. 5 is a schematic, exploded, side view of a backlight module employing the light guide plate of FIG. 1.

Referring to FIG. 5, this is a schematic, exploded, side view of a backlight module employing the light guide plate 32. The backlight module 70 includes a light source 71, the light guide plate 32, a bottom reflector 76, a brightness enhancement film 73, and a prism film 74.

The light source 71 is disposed adjacent to the light incident surface 321 of the light guide plate 32. The brightness enhancement film 73 and the prism film 74 are stacked in that order on the light output surface 322 of the light guide plate 32. The bottom reflector 76 is disposed under the bottom surface 323 of the light guide plate 32.

In operation, light beams emitted by the light source 71 enter the light guide plate 32 via the light incident surface 321, and then are reflected and refracted by the light guide elements 320 respectively. The light beams subsequently emit from the light output surface 322, and transmit through the brightness enhancement film 73 and the prism film 74 to provide illumination for a display (not shown).

In the light guide plate 32, the reflectivity indexes of the light guide elements 320 and the angles between the light refractive surfaces 324 and the bottom surface 323 can be selected and arranged so that most if not all of light beams entering the light guide plate 32 are emitted from the light output surface 322. Thereby, the backlight module 70 is highly efficient in the utilization of light beams.

Figure 6:
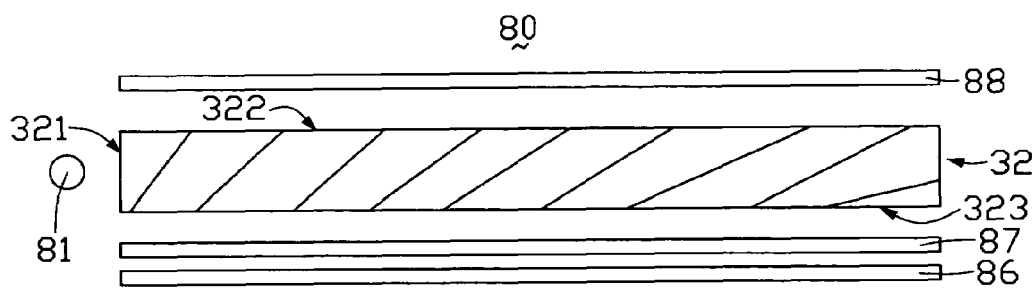
FIG. 6 is a schematic, exploded, side view of another backlight module employing the light guide plate of FIG. 1.
Figure 7:
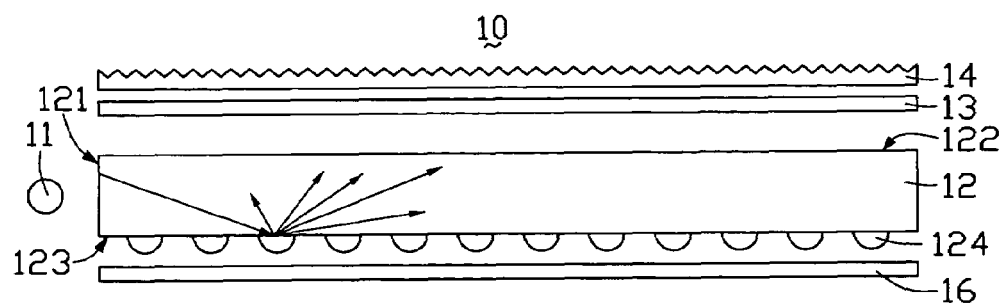
FIG. 7 is a schematic, exploded, side view of a conventional backlight module, showing light propagation in a light guide plate thereof.

Referring to FIG. 6, this is a schematic, exploded, side view of another backlight module employing the light guide plate 32. The backlight module 80 includes a light source 81, the light guide plate 32, a reflector 86, a retardation film 87, and a brightness enhancement film 88.

The light source 81 is disposed adjacent to the light incident surface 321 of the light guide plate 32. The brightness enhancement film 88 is disposed on the light output surface 322 of the light guide plate 32. The retardation film 87 and the reflector 86 are disposed under a bottom surface 323 of the light guide plate 32.

In the backlight module 80, the brightness enhancement film 88 is preferably a Dual Brightness Enhancement Film (DBEF) manufactured by Minnesota Mining and Manufacturing Company of the U.S.A., or made of cholesteric liquid crystal. The retardation film 87 is a quarter wave plate.

In any of the above-described light guide plates or backlight modules, the reflectivity indexes of the light guide elements and the angles between the light refractive surfaces and the bottom surface can be selected and arranged so that most if not all of the light beams entering the light guide plate are emitted from the light output surface. Thereby, the light guide plate or the backlight module is highly efficient in the utilization of light beams.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light guide plate, comprising:
a light incident surface, a bottom surface, and a plurality of substantially internal light guide elements, wherein each light guide element has a light refractive surface generally facing the light incident surface, angles between the light refractive surfaces and the bottom surface are acute angles and progressively decrease along a direction away from the light incident surface, and a refractive index of each light guide element is different from that of adjacent light guide elements.

2. The light guide plate as claimed in claim 1, wherein the light guide elements are made from resin selected from the group consisting of polymethyl methacrylate resin, polyacrylic acid resin, polycarbonate, and polyvinyl resin.

3. The light guide plate as claimed in claim 1, wherein the light refractive surface is a planar surface.

4. The light guide plate as claimed in claim 1, wherein the light incident surface is a planar surface.

5. The light guide plate as claimed in claim 1, wherein the light incident surface has a grating thereat.

6. The light guide plate as claimed in claim 1, wherein the light incident surface has an arc-shaped profile, and a center of an imaginary circle that the arc lies on is located outside the light guide plate.

7. The light guide plate as claimed in claim 1, further comprising a light output surface opposite to the bottom surface, wherein the light output surface has a plurality of liner prisms provided thereat.

8. A backlight module, comprising:
a light source;
a light guide plate comprising a light incident surface adjacent to the light source, a bottom surface, and a plurality of substantially internal light guide elements, wherein each light guide element has a light refractive surface opposite to the light incident surface, angles between the light refractive surfaces and the bottom surface are acute angles and progressively decrease along a direction away form the light incident surface, and a refractive index of each light guide element is different from that of adjacent light guide elements; and
a reflector disposed generally adjacent to the bottom surface.

9. The backlight module as claimed in claim 8, wherein the light guide elements are made from resin selected from the group consisting of polymethyl methacrylate resin, polyacrylic acid resin, polycarbonate, and polyvinyl resin.

10. The backlight module as claimed in claim 8, further comprising a brightness enhancement film and a retardation film, and the light guide plate further comprising a light output surface, wherein the brightness enhancement film is disposed on the light output surface, and the retardation film is disposed between the bottom surface and the reflector.

11. The backlight module as claimed in claim 10, wherein the brightness enhancement film is a Dual Brightness Enhancement Film.

12. The backlight module as claimed in claim 10, wherein the brightness enhancement film is made of cholesteric liquid crystal.

13. The backlight module as claimed in claim 10, wherein the retardation film is a quarter wave plate.

* * * * *